United States Patent Office 3,254,037
Patented May 31, 1966

3,254,037
ADHESIVE FOR LIGNOCELLULOSIC PARTICLES
Thomas F. Duncan, Bainbridge, N.Y., assignor to The Borden Company, New York, N.Y., a corporation of New Jersey
No Drawing. Filed July 20, 1962, Ser. No. 211,432
5 Claims. (Cl. 260—17.2)

This invention relates to the bonding of wood or like lignocellulosic particles and to the binder therefor, as in particle boards.

There has been extensive use of alkaline solutions of phenol formaldehyde resins as a binder in such boards. There has been little difficulty recently in making boards that retain at least 50% of their original strength after the boiling water test. The boards so made have been subject, however, to objectionable expansion in thickness on treatment with water, particularly in the double boil test which is standard for testing the dimensional stability of durable type boards.

This invention provides an adhesive which reduces the thickness expansion under such conditions to a level that is either negligible or satisfactory.

To produce this desired dimensioned stability, I introduce into the resin solution a large amount of an additive that itself is so strongly absorptive of water as to deliquesce when exposed to the atmosphere.

Briefly stated the invention comprises an adhesive composition on a thermosetting phenol formaldehyde resin solution and an abnormally large proportiton of sodium hydroxide or like alkali dissolved in the solution. The invention includes also the herein described process of making articles by the application of the said adhesive composition to particles of lignocellulosic material, compressing the treated material, to shape and consolidate it, and heat curing the resin in the shaped mass while under compression.

In representative products made as described in detail later herein, I reduce the thickness expansion in the double boil test from about 12%, when the sodium hydroxide content in the resin alkali solution is below the critical range, to 0%–3.8% with my alkali content of 3–7.5 parts for 7 parts of the resin solids.

The surprising effect of the sodium hydroxide, which is itself strongly hygroscopic, is attributed to the action of it, in high concentartion and proportion and in contact with the phenolic resin, on the lignocellulosic particles. There is still no poistive explanatiotn of the mechanism by which the effect is obtained. I consider it to be due in part at least to such consolidation or stabilizing of the dimensions of the fibers of the lignocellulosic material so that absorption of the water, which still occurs after the treatment of the particles with the alkali resin, has a minimized effect on their change in dimensions, even after long boiling with water and subsequent drying. The action may include mercerizing surfaces of the lignocellulosic particles after the alkali resin solution is applied and before the high temperature curing in the hot press is completed. It is noted that the application of the alkali resin solution to the wood particles in the amounts shown in Example 3, for instance, caused a rise in the temperature of approximately 30°, from 80° to 110° F.

As to materials, the lignocellulosic particles are fragmented material in which the cellulosic fibers in the fragments are still bonded by native lignin. They may be and suitably are those that are usual in making particle boards as, for example, wood flakes, splinters, or other particles of wood, e.g., aspen, Douglas fir, pine, gum, and poplar as well as other lignocellulosic agricultural wastes such as bagasse and flax shives. Chemically treated wood pulps are not satisfactory in making the particle board.

The selected lignocellulosic matreials, as used, should be in the commercially dried condition. A suitable moisture content is that of the oven dried material of total moisture content, after the application thereto of the aqueous alkali resin binder solution, of about 9% to 15%. Best results are obtained when the particle board mixture subjected to the hot pressing operation has a total moisture content within the approximate range 10%–12%. For each 1% of increased moisture above this amount, the time required in the hot press cycle is increased by a substantial amount such as about a minute.

The thermosetting resin is a phenol formaldehyde condensate. The resole or single stage resin, resulting from the condensation in alkaline medium of phenol and formaldehyde in the proportion of about 1–3.5 and usually 1.5–2.5 moles of formaldehyde for 1 mole of phenol, is employed. There may be used other phenols as, for instance, resorcinol or m-cresol to replace all or part of the phenol, the choice depending in part upon the speed of thermosetting desired in the finished product. In place of the formaldehyde, there can be used furfural either alone or mixed with the formaldehyde.

The alkali used is one of the strong caustic alkalies as, for instance, sodium, potassium, or lithium hydroxide. Sodium hydroxide, being entirely satisfactory and most economical, is the one recommended for commercial use. There is no advantage in using barium hydroxide that offsets the inconvenience in its use.

As to proportions, the sodium hydroxide or the like is used in the amount of 3%–10%, e.g., 5.5% of the oven dried weight of the lignocellulosic particles being bonded, and of 30%–125% of the phenol formaldehyde or other thermosetting resin, 80% giving good overall properties to the board. The proportion of sodium hydroxide should be about 15–60 parts and advantageously 20–40 parts for 100 of total water in the mixed lignocellulosic particles and adhesive solution but not above the saturation proportion at the temperature of use.

The resin is used in the mount of about 3%–10% of the lignocellulosic particles.

These and other proportions in the adhesive composition are given herein as parts by weight on the dry basis unless specifically stated to the contrary and the lignocellulosic particles on the oven dried basis.

The wood or other lignocellulosic particles are stirred slowly during and after the spraying, so as to distribute the resin over the flakes substantially uniformly. The thus formed mixture is shaped and compressed in the usual hot press of the particle board industry at about 50–450 p.s.i. and heated, while the mass is under such compression, as to a temperature of about 250°–380° F., the range for best results being 280°–320° F.

The invention is illustrated in greater detail in the following specific examples.

*Examples 1–3*

Particle boards were made of the formulas, by the conditions, and of the properties shown in Examples 1, 2 and 3 below and compared with the controls A and B, the controls using no or little sodium hydroxide above the amount of the catalyst in the original condensation of the phenol and formaldehyde.

The resole resin solution as made contained 3.5 parts of sodium hydroxide and 46.5 of the resin solids for 100 parts of the total aqueous solution. Into this there was mixed additional sodium hydroxide in the form of a 50% solution and in amount to provide a total of 3.0–7.5 parts of sodium hydroxide on the dry basis for 7 parts of the resin solution solids and for 100 parts of the oven dried aspen flakes.

Flakes of aspen were sprayed with the binder composition, blended by gentle stirring during and after the spraying, and then formed into a mat in usual manner. The individual mats were pressed in a steam heated hot press and cured for 12 minutes and 320° F. while under compression, all conditions and equipment being conventional.

In Control B, the alkali content of the resole solution was made 11% of sodium hydroxide instead of 3.5% in Control A. The Control B is a conventional highly alkaline phenol-formaldehyde resin glue for Douglas fir plywood.

| Component, Parts for 100 parts Aspen Flakes, and Properties of Finished Board | Example Nos. | | | Controls | |
|---|---|---|---|---|---|
| | 1 | 2 | 3 | A | B |
| Resole resin | 7.0 | 7.0 | 7.0 | 7.0 | 7.0 |
| Additional NaOH | 2.5 | 5.0 | 7.0 | | |
| Total NaOH including that in resin solids | 3.0 | 5.5 | 7.5 | 0.5 | 1.5 |
| Press Time, mins. at 320° F | 12 | 12 | 12 | 12 | 12 |
| Board Specific Gravity | .72 | .74 | .71 | .70 | .68 |
| Modulus of Rupture, p.s.i | 4,370 | 4,210 | 3,920 | 4,830 | 4,620 |
| Internal Bond, p.s.i | 105 | 111 | 81 | 110 | 111 |
| Water Absorption, Percent [1] | 31.5 | 28.0 | 33.5 | 25.6 | 43.5 |
| Thickness Expansion, Percent | 4.8 | 4.1 | 4.4 | 4.4 | 7.3 |
| Double Boil Results [2]: Expansion Thickness, Percent | 3.8 | 2.1 | 0.0 | 12.4 | 12.0 |

[1] These results are based on 24 hour temperature soak period as outlined in A.S.T.M. D-1037-60T (Tentative Methods of Test for Evaluating the Properties of Wood Base Fiber and Particle Panel Material).
[2] The Double Boil Test procedure consisted of boiling 4 hours; drying 20 hours at 220° F.; boiling 4 hours; drying 20 hours at 220° F.; conditioning for 48 hours at 74° F. and 57% Relative Humidity, and then measuring percent change from original thickness before boiling.

*Example 4*

In this Example, the compositions and procedure of Example 3 are used, with the exception that the 2.5, 5.0 and 7.0 parts of additional NaOH are sprayed on the aspen wood flakes and the resin solution with its original alkali content then sprayed separately upon them. The mixing, shaping, hot press curing, and testing effected as described in the Example 3.

The properties of the finished particle board, including the water absorption and double boil tests, are satisfactory.

It is to be understood that it is intended to cover all changes and modifications of the examples of the invention herein chosen for the purpose of illustration which do not constitute departures from the spirit and scope of the invention.

I claim:
1. In making a particle board, the process which comprises applying to dried lignocellulosic particles an alkali solution of a phenol formaldehyde resole resin including an alkali metal hydroxide in the proportion of about 30%–125% of the weight of the resin, mixing the particles so treated, compressing the particles with applied resin into a shaped article, and heat curing the resin in the compressed article, the said hydroxide and resin being applied to the said particles in proportion to provide about 3–10 parts of the hydroxide and 3 to 10 parts of the resin for 100 parts of the said particles on the oven dried basis.

2. The process of claim 1, the said alkali metal hydroxide being sodium hydroxide and the proportion of it being approximately 5.5% of the weight of the lignocellulosic particles and 80% by weight of the phenol formaldehyde resin.

3. The process of claim 1, the said particles being wood flakes and the temperature of said curing being approximately 280°–380° F.

4. The process of claim 1, the said alkali metal hydroxide being sodium hydroxide and the proportion of it being approximately 15–60 parts for 100 parts of total water in the said mass subjected to the shaping.

5. A particle board of thickness expansion within the range approximately 0%–3.8% of the original thickness of the said board, after a total of 8 hours immersion in boiling water and drying for 20 hours after the first 4 hours of immersion and for 20 hours additionally after the second 4 hours of immersion, the binder in the said board containing a phenol formaldehyde resin and sodium hydroxide compounded therewith in the proportion of about 30%–125% of the weight of the said resin.

References Cited by the Examiner

UNITED STATES PATENTS 2,967,836　1/1961　Moffitt et al. _____ 260—17.2
3,023,136　2/1962　Himmelheber et al. __ 260—17.3

WILLIAM H. SHORT, *Primary Examiner.*

JAMES A. SEIDLECK, LOUISE P. QUAST, *Examiners.*

JAMES NORRIS, *Assistant Examiner.*